July 20, 1948. H. R. THOMAS 2,445,340
LONG-BASE STRAIN OR DISTANCE GAUGE
Filed July 30, 1946
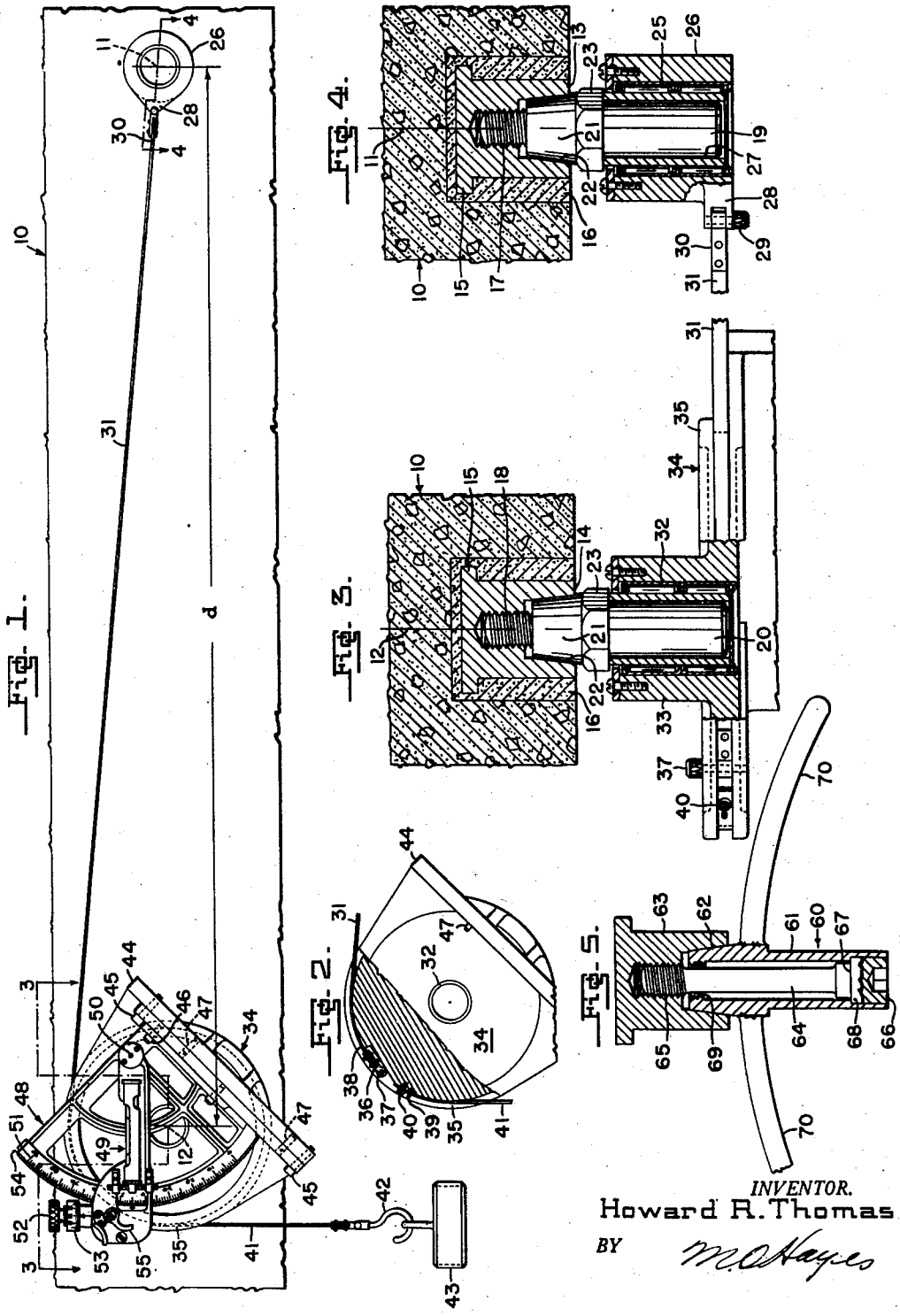
INVENTOR.
Howard R. Thomas
BY
ATTORNEY.

Patented July 20, 1948

2,445,340

UNITED STATES PATENT OFFICE 2,445,340

LONG-BASE STRAIN OR DISTANCE GAUGE

Howard R. Thomas, Kensington, Md.

Application July 30, 1946, Serial No. 687,052

8 Claims. (Cl. 33—125)

(Granted under the act of March 3, 1883, as amended April 30, 1928; 370 O. G. 757)

The invention relates to improvements in geometrical instruments for measuring distances and more specifically to an improved long-base strain gage.

An important object of the invention is to provide a strain gage for accurately measuring very small changes in distance between two widely spaced points.

Another object of the invention is the provision of an improved strain gage for accurately re-measuring the distance between two spaced zones, upon the expiration of a period of time during which the gage has been separated from the work, to determine the relative displacement, if any, of said zones that has occurred during the elapsed time.

A further object is the provision of a gage for determining changes in distance by angular measurement.

A still further object is to provide a gage as described which utilizes a conventional gunner's quadrant for determining changes in distance by vertical angular measurement.

Other objects and advantages of the invention will become apparent during the course of the following detailed description, taken in connection with the accompanying drawing, forming a part of this specification, and in which drawing:

Figure 1 is a side elevational view illustrating one use of the gage in measuring distance along a vertical wall.

Figure 2 is a fragmentary view in side elevation illustrating constructional details of the gage.

Figures 3 and 4 are fragmentary horizontal sectional views of the gage and wall, taken substantially on the lines 3—3 and 4—4 respectively of Figure 1, and showing one form of removable shaft connection between the gage and wall.

Figure 5 is a central longitudinal sectional view of a modified form of removable shaft.

In the drawing, which for the purpose of illustration shows preferred and modified forms and wherein similar reference characters denote corresponding parts throughout the views, the numeral 10 generally designates a vertical wall which includes widely spaced zones 11, 12 separated by a variable distance d. Wall 10 may be a concrete tank or basin wall which undergoes dimensional changes during setting of the concrete, or in use. Embedded in the vertical wall 10 at zones 11, 12 are socket members 13, 14 each provided at its inner end with a flange 15 cooperating with cement 16 to firmly anchor the socket members 13, 14 in the wall. Although two socket members 13, 14 have been shown embedded in the wall section, it will be understood that similar socket members may be located at any number of selected spots in monolithic or sectional walls or in one or more independently standing structures or parts thereof.

Releasably fastened to the socket members 13, 14 as by screw threads 17, 18 are shafts 19, 20 each having frusto-conical portions 21 respectively adapted to engage frusto-conical seats 22 in the socket members. To facilitate attachment and removal of the shafts 19, 20, each is provided with a polygonal section 23 for cooperation with a suitable wrench. The socket members 13, 14 are so anchored in the wall that upon fastening the shafts 19, 20 thereto, the shaft axes will be horizontally disposed in parallel relation normal to the wall surface.

Rotatably supported on the shaft 19, as by a double-row Torrington needle bearing assembly 25, is a collar 26 that may be readily removed from the shaft by sliding axially thereof. The bearing assembly 25 includes a removable bushing 27 that fits closely on the shaft 19 and normally abuts the polygonal section 23 thereof. The parts 25, 26 and 27 are closely fitted so there will be no appreciable radial play of the collar 26 on the shaft 19.

Pivotally attached to the periphery of collar 26, as by a lug 28 and pin 29 is one end 30 of a tapeline 31 preferably formed of a steel alloy, such as Invar, having a low coefficient of linear expansion at ordinary temperatures.

Rotatably supported on the shaft 20, as by a needle bearing assembly 32 is the hub 33 of a wheel 34 having a grooved rim 35. Extending along a portion of the grooved rim 35 and attached to the wheel as by a clevis 36 and transverse pin 37 is the opposite end portion 38 of the tapeline. Extending along another portion of the grooved rim 35 and attached thereto as by a pin 39 and capscrew 40 is the upper end of a depending tape 41 provided at its free lower end with a hook 42 supporting a removable weight 43. The force of gravity acting on this weight urges the vertical wheel 34 to turn in a counter-clockwise direction as viewed in Figure 1 so that a predetermined tension will be imparted to the tapeline 31.

Integrally formed on the outer side of the wheel substantially opposite the point 37 of attachment of the tape-line is a shelf-like flange or bracket 44 disposed in perpendicular chordal relation to the wheel. Attached to this bracket 44 in spaced parallel relation to the wheel as by suitable cap screws 45, 46 and pins 47 is a conventional gunner's quadrant 48 including a precision spirit level 49 pivoted at one end to the quadrant vertex 50. At its free end the spirit level is accurately adjustable relative to the degrees scale 51 of the quadrant by worm and sector gearing of the type shown and described in Zeiss Patent 891,621 granted on the invention of A. Konig. The gunner's quadrant 48 shown in Figure 1 of the accompanying drawing is equipped with a worm-rotating knob 52, similar to that shown in the reference patent, and which knob carries a minutes scale 53 and is so geared to the sector gear 54 of quadrant 48 that a complete turn of the knob 52 will effect a one-degree displacement of the spirit level 49. With this arrangement it is clear that rotation of the knob 52 through one division of the minutes scale 53 will change the angular relationship of the spirit level and quadrant by $1/21,600$ of a complete revolution. For convenience, therefore, it is preferred that the operative portions of the wheel rim be of a uniform radial curvature such that the effective circumference of the wheel rim 35 is exactly 21.600 inches whereby, with the bubble of the spirit level initially centered, a one-thousandth inch circumferential displacement of the wheel rim will require rotation of the knob 52 through one division of the minutes scale 53 in order to return the bubble to its centered position.

If it should be desired to measure linear distance changes in units other than inches, or to employ a quadrant having angular measuring units other than degrees and minutes, the circumference of the wheel rim may be made of a size such that some convenient ratio will exist between the number of units of length in the rim circumference and the number of units of angular measurement into which the quadrant is divided.

In the use of the gage for measuring changes in the distance $d$, assuming that the equipment has been attached to the work as illustrated in Figure 1, the spirit level 49 is first roughly adjusted to an approximately horizontal position by pressing a worm-releasing thumb-latch 55 and swinging the spirit level 49 relative to the degrees scale 51 of the quadrant. Then fine adjustment of the spirit level is accomplished by rotation of the knob 52 to a position wherein the bubble of the spirit level is exactly centered. The setting of the instrument, say 45° 5′, is then noted. If the change in distance $d$ to be measured takes place over a long period of time, the equipment, with the exception of the socket members 13, 14, may be removed from the work for the use elsewhere or for storage in a safe place. Later, the equipment is re-assembled and a second reading, say 45° 7′, is taken. Inasmuch as each division of the minutes scale of the quadrant corresponds to $1/21,600$ of a revolution and the rim of the wheel is made 21.600 inch in effective circumference, a change of one minute in the angular setting of the quadrant to maintain the spirit level horizontal represents a change of one thousandth of an inch in the distance $d$. Any decrease in the distance $d$ permits displacement of the wheel 34 in a counter-clockwise direction under the influence of weight 43; any increase in the distance $d$ results in clockwise displacement of the wheel and elevation of the weight. In either case, tension on the tapeline 31 will remain substantially uniform throughout the operating range of the gage. A difference between the two readings of +2 minutes would therefore indicate a change in distance $d$ of −2 thousandths of an inch.

In Figure 5 is shown an alternate shaft assembly 60 comprising a hollow shaft portion 61 tapered at its forward end 62 to engage the frusto-conical seat of a socket member 63 similar to the previously described members 13, 14. Extending through the hollow shaft portion 61 is an axial bolt portion 64 having a threaded shank 65 for engagement with the internally threaded socket member 63. The axial bolt portion 64 includes a socket head 66 providing an annular shoulder 67 engaging an annular face 68 interiorly of the hollow shaft portion 61. The two parts are assembled to prevent casual separation by threading the bolt portion 64 through an internally threaded portion 69 of the hollow shaft. If the shaft portion 61 is held against rotation, as by handles 70, while the bolt portion 64 is threaded into the socket member 63, the shaft portion 61 will be axially drawn into engagement at its tapered forward end with the socket member so as to eliminate any rotary friction and wear between the shaft and socket member during the seating operation. With this wear eliminated, the equipment may be dismantled as often as desired and the original assembled relationship of the shaft and socket member re-established each time the parts are assembled.

Various changes may be made in the forms of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. A gage for measuring small changes in linear distance between two relatively distantly spaced zones comprising a line having one end portion for attachment at one of said zones, a support to be disposed in the other of said zones, a member rotatable in a vertical plane about said support and having a circumferential rim portion, said line at its opposite end portion being attached to the rotatable member and extending along the rim portion, means urging the rotatable member to turn in a direction to tension the line, the vertical angular position of said rotatable member with the line tensioned varying with the distance between said zones, a spirit level mounted for vertical swinging adjustment parallel to the rotatable member, and a scale cooperating with the spirit level for measuring changes in the vertical angular position of the rotatable member.

2. A gage for measuring small changes in linear distance between two relatively distantly spaced zones comprising a line having one end portion for attachment at one of said zones, an axle to be horizontally disposed in the other of said zones, a wheel rotatable in a vertical plane about said axle and having a circumferential rim, said line at its opposite end portion being attached to the wheel and extending along a portion of the rim, means urging the wheel to turn in a direction to tension the line, the vertical angular position of said wheel with the line tensioned varying with the distance between said spaced zones, a spirit level mounted for vertical swinging adjustment parallel to the wheel, means for adjusting the level relative to the wheel, and means for indicating the adjusted angular relation of the level and wheel.

3. A gage comprising two supports to be mounted in spaced zones subject to relative displacement, a line having one end portion attached to one of said supports, a member rotatable in a vertical plane on the other of said supports and having a circumferential rim portion, said line at its opposite end portion being attached to the rotatable member and extending along the rim portion, means urging the rotatable member to turn in a direction to tension the line, the vertical angular position of said rotatable member with the line tensioned varying with the distance between said zones, a spirit level mounted for vertical swinging adjustment parallel to the rotatable member, and a scale cooperating with the spirit level for measuring changes in the vertical angular position of the rotatable member.

4. A gage comprising two supports to be mounted in spaced zones subject to relative displacement, a line having one end portion attached to one of said supports, a wheel rotatable in a vertical plane about the other of said supports and having a circumferential rim, said line at its opposite end portion being attached to the wheel and extending along a portion of the rim, means urging the wheel to turn in a direction to tension the line, the vertical angular position of the wheel with the line tensioned varying with the distance between said spaced zones, a spirit level mounted for vertical swinging adjustment parallel to the wheel, means for adjusting the level relative to the wheel, and means for indicating the adjusted angular relation of the level and wheel.

5. In a long-base strain gage for measuring changes in distance between two spaced zones, two support members to be permanently fastened in said spaced zones, two posts for removable attachment to said support members in horizontal parallel positions, a line having one end portion attached to one of said posts, a wheel for rotation in a vertical plane on the other of said posts, said line at its opposite end portion being attached to the wheel and extending along a portion of the wheel rim, means urging the wheel to rotate in a direction to tension the line, the vertical angular position of the wheel when said line is tensioned varying with the distance between said posts, a spirit level mounted for vertical swinging adjustment parallel to the wheel, and means for indicating the adjusted angular relation of the level and wheel.

6. In a long-base strain gage for measuring changes in distance between two spaced zones, two support members to be permanently fashioned in said spaced zones, two posts for removable attachment to said support members in horizontal parallel positions, a collar for rotation on one of said posts, a line having one end portion attached to said collar, a wheel for rotation in a vertical plane on the other of said posts, said line at its opposite end portion being attached to the wheel and extending along a portion of the wheel rim, means urging the wheel to rotate in a direction to tension the line, the vertical angular position of the wheel when said line is tensioned varying with the distance between said posts, a spirit level mounted for vertical swinging adjustment parallel to the wheel, and means for indicating the adjusted angular relation of the level and wheel.

7. A gage for measuring small changes in linear distance between two relatively distantly spaced zones comprising a line having one end portion for attachment at one of said zones, an axle to be horizontally fixed in the other of said zones, a wheel mounted for rotation in a vertical plane on said axle, said line at its opposite end portion being attached to the wheel and extending along a portion of the wheel rim, means for tensioning the line, the vertical angular position of the wheel when said line is tensioned varying with the distance between said zones, a precision spirit level mounted for vertical swinging adjustment parallel to the wheel, means for adjusting the vertical angular relation of the level and wheel, a scale cooperating with the adjusting means for indicating in extremely small units of angular measurement the vertical angular relation of the wheel and level, the radius of curvature of said wheel rim portion being such that an extremely small unit change in linear distance between said zones will effect a change in the vertical angular position of said wheel equal to one of said extremely small units of angular measurement.

8. A gage for measuring small changes in linear distance between two relatively distantly spaced zones comprising a line having one end portion for attachment at one of said zones, an axle to be horizontally fixed in the other of said zones, a wheel mounted for rotation in a vertical plane on said axle, said line at its opposite end portion being attached to the wheel and extending along a portion of the wheel rim, means for tensioning the line, the vertical angular position of the wheel when said line is tensioned varying with the distance between said zones, a precision spirit level mounted for vertical swinging adjustment parallel to the wheel, a scale carried by the wheel for indicating in small units of angular measurement the vertical angular relation of the level and wheel, means for adjusting the vertical angular relation of the level and wheel, another scale cooperating with the adjusting means for indicating in small subdivisions of said units of angular measurement the vertical angular relation of the wheel and level, the radius of curvature of said wheel rim portion being such that an extremely small unit change in linear distance between said zones will effect a change in the vertical angular position of said wheel equal to one of said small subdivisions of said units of angular measurement.

HOWARD R. THOMAS.